United States Patent
Wu et al.

(10) Patent No.: US 12,133,264 B2
(45) Date of Patent: Oct. 29, 2024

(54) METHOD FOR SELECTING RANDOM ACCESS REQUEST RESOURCE, TERMINAL, AND NETWORK DEVICE

(71) Applicant: VIVO MOBILE COMMUNICATION CO., LTD., Guangdong (CN)

(72) Inventors: Yumin Wu, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 341 days.

(21) Appl. No.: 17/583,523

(22) Filed: Jan. 25, 2022

(65) Prior Publication Data

US 2022/0150977 A1    May 12, 2022

Related U.S. Application Data

(63) Continuation of application No. PCT/CN2020/107078, filed on Aug. 5, 2020.

(30) Foreign Application Priority Data

Aug. 6, 2019  (CN) .......................... 201910723270.8

(51) Int. Cl.
  *H04W 74/08*    (2024.01)
  *H04W 72/02*    (2009.01)
  (Continued)

(52) U.S. Cl.
  CPC ....... *H04W 74/0833* (2013.01); *H04W 72/02* (2013.01); *H04W 72/044* (2013.01); *H04W 74/004* (2013.01)

(58) Field of Classification Search
  CPC . H04W 72/02; H04W 72/044; H04W 74/004; H04W 74/006; H04W 74/0833
  See application file for complete search history.

(56) References Cited

U.S. PATENT DOCUMENTS 9,949,195 B1 *  4/2018  Oroskar ............ H04W 36/0077
11,039,477 B2 *  6/2021  Charbit ................. H04W 72/23
(Continued)

FOREIGN PATENT DOCUMENTS

CN    107734667 A    2/2018
CN    107888329 A    4/2018
(Continued)

OTHER PUBLICATIONS

3rd Generation Partnership Project: Technical Specification Group Radio Access Network; NR; Medium Access Control (MAC) protocol specification (Release 15); 3GPP TS38.321 v15.6.0 (Jun. 2019) (78 pages).
(Continued)

*Primary Examiner* — Liton Miah
(74) *Attorney, Agent, or Firm* — Price Heneveld LLP (57) ABSTRACT

This disclosure discloses a method for selecting a random access request resource, a terminal, and a network device. The method is applied to the terminal and includes: obtaining configuration information for a random access procedure used for transmitting uplink data, where the configuration information is used for at least one data size range and a random access request resource corresponding to each data size range; and selecting, according to the configuration information, a random access request resource corresponding to a data size range of uplink data.

12 Claims, 4 Drawing Sheets

(51) Int. Cl.
*H04W 72/04* (2023.01)
*H04W 72/044* (2023.01)
*H04W 74/00* (2009.01)
*H04W 74/0833* (2024.01)

(56) References Cited

U.S. PATENT DOCUMENTS

| | | | |
|---|---|---|---|
| 11,102,764 B2* | 8/2021 | Shrestha | H04W 72/02 |
| 11,304,235 B2* | 4/2022 | Liu | H04W 74/0833 |
| 2017/0223740 A1 | 8/2017 | Mallik et al. | |
| 2018/0014301 A1 | 1/2018 | Chen et al. | |
| 2018/0368186 A1* | 12/2018 | Gu | H04W 56/001 |
| 2019/0159257 A1 | 5/2019 | Rico Alvarino et al. | |
| 2019/0223212 A1 | 7/2019 | Xiao et al. | |
| 2019/0239252 A1 | 8/2019 | Babaei et al. | |
| 2019/0320467 A1* | 10/2019 | Freda | H04W 74/004 |
| 2021/0058823 A1 | 2/2021 | Liu et al. | |
| 2021/0136827 A1* | 5/2021 | Xiong | H04W 74/004 |
| 2022/0256587 A1 | 8/2022 | Fujishiro et al. | |

FOREIGN PATENT DOCUMENTS

| | | |
|---|---|---|
| CN | 108605361 A | 9/2018 |
| CN | 109417447 A | 3/2019 |
| CN | 110062474 A | 7/2019 |
| CN | 111357379 A | 6/2020 |
| WO | 2019031427 A1 | 2/2019 |
| WO | 2019099087 A1 | 5/2019 |
| WO | 2019099709 A1 | 5/2019 |
| WO | 2019145129 A1 | 8/2019 |

OTHER PUBLICATIONS

Ericsson, "UP solution for early data transmission," 3GPP TSG-RAN WG2 #99bis Tdoc R2-1710522; Prague, Czech Republic, Oct. 9-13, 2017 (5 pages).

Vivo, "Considerations on the 2-step RACH procedure, " 3GPP TSG-RAN WG2 Meeting #105bis R2-1903077; Xi'an, China, Apr. 8-12, 2019 (6 pages).

Ericsson, "TB sizes and UL grant for Msg3", 3GPP TSG-RAN WG2 #101, R2-1803080, Athens, Greece, Feb. 26-Mar. 2, 2018.

* cited by examiner

METHOD FOR SELECTING RANDOM ACCESS REQUEST RESOURCE, TERMINAL, AND NETWORK DEVICE

CROSS-REFERENCE TO RELATED APPLICATIONS

The present application is a bypass continuation application of International Application No. PCT/CN2020/107078 filed on Aug. 5, 2020, which claims priority to Chinese Patent Application No. 201910723270.8 filed in China on Aug. 6, 2019, which are incorporated herein by reference in their entireties.

TECHNICAL FIELD

This disclosure relates to the field of communications technologies, and in particular, to a method for selecting a random access request resource, a terminal, and a network device.

BACKGROUND

Early data transmission (EDT) includes a 4-step random access procedure and a 2-step random access procedure. Based on a resource configured by the network device, a terminal in an idle or inactive state may directly send data to the network device by using the third message of the 4-step random access procedure for initial access, or directly send data to the network device by using the first message of the 2-step random access procedure for initial access.

However, transmission of various types of uplink data of different sizes cannot be supported in the 2-step random access procedure and the 4-step random access procedure in the related art.

SUMMARY

In order to resolve the foregoing technical problem, this disclosure is implemented as follows:

According to a first aspect, an embodiment of this disclosure provides a method for selecting a random access request resource, applied to a terminal and including:
  obtaining configuration information for a random access procedure used for transmitting uplink data, where the configuration information is used for at least one data size range and a random access request resource corresponding to each data size range; and
  selecting, according to the configuration information, a random access request resource corresponding to a data size range of uplink data.

According to a second aspect, an embodiment of this disclosure further provides a method for selecting a random access request resource, applied to a network device and including:
  sending configuration information for a random access procedure used for transmitting uplink data, where the configuration information is used for at least one data size range and a random access request resource corresponding to each data size range.

According to a third aspect, an embodiment of this disclosure further provides a terminal, including:
  an obtaining module, configured to obtain configuration information for a random access procedure used for transmitting uplink data, where the configuration information is used for at least one data size range and a random access request resource corresponding to each data size range; and
  a selection module, configured to select, according to the configuration information, a random access request resource corresponding to a data size range of uplink data.

According to a fourth aspect, an embodiment of this disclosure further provides a terminal, including a memory, a processor, and a computer program stored in a memory and capable of running on the processor, and when the computer program is executed by the processor, the steps in the method for selecting a random access request resource described above are implemented.

According to a fifth aspect, an embodiment of this disclosure further provides a network device, including:
  a transmitting module, configured to send configuration information for a random access procedure used for transmitting uplink data, where the configuration information is used for at least one data size range and a random access request resource corresponding to each data size range.

According to a sixth aspect, an embodiment of this disclosure further provides a network device, including a memory, a processor, and a computer program stored in a memory and capable of running on the processor, and when the computer program is executed by the processor, the steps in the method for selecting a random access request resource described above are implemented.

According to a seventh aspect, an embodiment of this disclosure further provides a computer-readable storage medium, where the computer-readable storage medium stores a computer program. When the computer program is executed by a processor, the steps of the method for selecting a random access request resource described above are implemented.

The embodiments of this disclosure have the following beneficial effects:

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DETAILED DESCRIPTION OF EMBODIMENTS

Exemplary embodiments of this disclosure will be described below in more detail with reference to the accompanying drawings. Although the accompanying drawings show exemplary embodiments of this disclosure, it should be understood that this disclosure may be implemented in various forms and should not be limited by the embodiments described herein. Instead, these embodiments are provided so that this disclosure will be better understood, and the scope of this disclosure can be fully conveyed to those skilled in the art.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

For description of the embodiments of this disclosure, some concepts to be used in the following description are first interpreted.

Introduction to 2-Step Random Access Procedure

A network device configures, for a terminal, configuration information for the 2-step random access procedure. The configuration information includes information about transmission resources corresponding to the first message, namely request information (MsgA), and a second message, namely confirmation information (MsgB).

The terminal triggers a 2-step random access procedure, that is, 2-step RACH (Random Access Channel), and sends request information (MsgA) to the network device, for example, through a physical uplink shared channel (PUSCH), and the terminal may alternatively send physical random access channel (PRACH) information to the network device.

The network device sends confirmation information (MsgB) to the terminal; and if the terminal fails to receive the confirmation information (MsgB), the terminal needs to send the request information (MsgA) again.

Introduction to 4-Step Random Access Procedure

A random access procedure of the terminal includes: a contention-based random access procedure and a contention-free random access procedure.

Contention-Based Random Access Procedure:

The terminal sends the first message (Msg1) to the network device, and the first message includes random access request information.

After receiving the Msg1, the network device sends a second message (Msg2) to the terminal, where the Msg2 includes random access response (RAR) information, and the second message carries an uplink grant message.

Based on an uplink grant in the Msg2, the terminal executes a medium access control (MAC) layer packaging function to generate a MAC protocol data unit (PDU), and stores the MAC PDU in the third message (Msg3) buffer; and the terminal sends the MAC PDU in the Msg3 buffer by using a hybrid automatic repeat request (HARQ) process.

After receiving the Msg3, the network device sends a fourth message (Msg4), for example, a contention resolution identifier, to the terminal.

After receiving the fourth message, the terminal determines whether contention resolution is successful. If successful, the random access procedure is successful; otherwise, the random access procedure is re-initiated. For the re-initiated random access procedure, after the terminal receives uplink grant information in the second message again, the terminal directly fetches the previously stored MAC PDU from the third-message buffer and sends the MAC PDU by using the HARQ process. After the random access procedure is completed, the terminal may clear a HARQ buffer that is for transmission of the third message in the random access procedure.

However, transmission of a plurality of types of uplink data of different sizes cannot be supported in the 2-step random access procedure and the 4-step random access procedure in the related art. Therefore, this disclosure provides a method for selecting a random access request resource, a terminal, and a network device, which are used to support transmission of a plurality of types of uplink data of different sizes.

Figure 1:
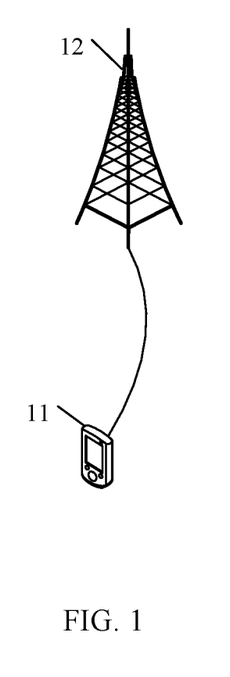
FIG. 1 is a structural diagram of a network system to which the embodiments of this disclosure are applicable.

Referring to FIG. 1, FIG. 1 is a block diagram of a wireless communications system to which the embodiments of this disclosure are applicable. The wireless communications system includes a terminal 11 and a network device 12. The terminal 11 may also be referred to as a terminal device or user terminal (User Equipment, UE). The terminal 11 may be a terminal-side device such as a mobile phone, a tablet computer, a laptop computer, a personal digital assistant (PDA), a mobile Internet device (MID), a wearable device, or an in-vehicle device. It should be noted that a specific type of the terminal 11 is not limited in the embodiments of this disclosure. The network device 12 may be a base station or a core network. The base station may be a 5G base station and a base station of a later release (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. Provided that the same technical effects are achieved, the base station is not limited to a specific technical term. It should be noted that in the embodiments of this disclosure, the base station in the NR system is merely used as an example, and a specific type of the base station is not limited.

Figure 2:
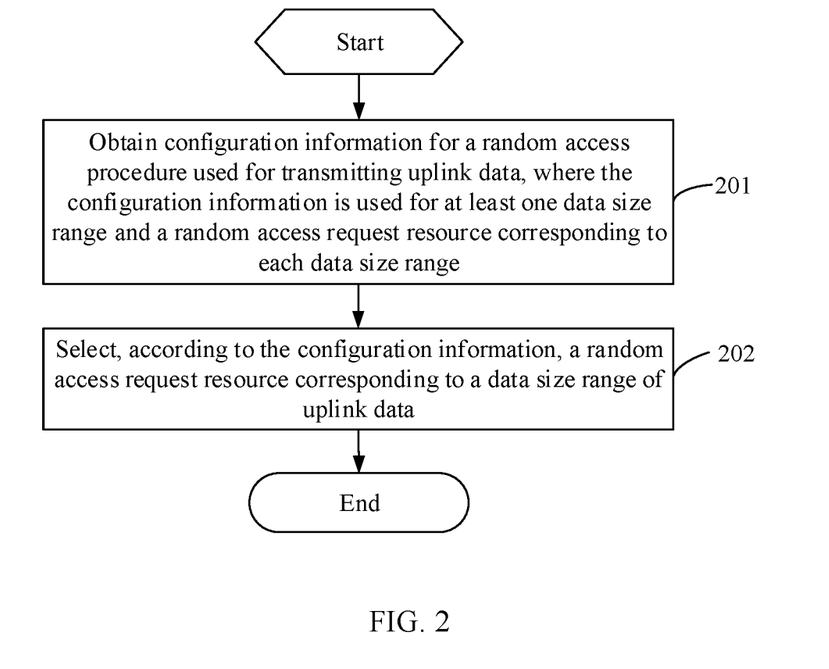
FIG. 2 is a schematic flowchart of a method for selecting a random access request resource according to an embodiment of this disclosure.

As shown in FIG. 2, an embodiment of this disclosure provides a method for selecting a random access request resource, applied to a terminal and including the following steps.

Step 201: Obtain configuration information for a random access procedure used for transmitting uplink data, where the configuration information is used for at least one data size range and a random access request resource corresponding to each data size range.

Specifically, content of the configuration information includes: a plurality of data size ranges that allow data sending in the third message of a 4-step random access procedure or the first message of a 2-step random access procedure (for example, a data size range 1=[50,100] bits; a data size range 2=[101,200] bits; and a data size range 3=[201,300] bits).

The uplink data may be user-plane data of the terminal, such as DRB data and/or quality of service flow (QoS flow).

Step 202: Select, according to the configuration information, a random access request resource corresponding to a data size range of uplink data.

Specifically, according to the configuration information in step 201, when the terminal has uplink data to be sent, the terminal triggers a random access procedure, and selects, according to a size of the uplink data, a random access request resource corresponding to a data size range of uplink data. The "data size range" may be one or more "data size ranges" capable of carrying the uplink data of the terminal, for example, those configured by the network device, the data size range 1=[50,100] bits, the data size range 2=[101, 200] bits, and the data size range 3=[201,300] bits. Different data size ranges correspond to different random access request resources. If the size of the uplink data, for example, a transport block size (TBS), sent by the terminal is 50 bits, the terminal can select random access request resources corresponding to the data size range 1, the data size range 2, and the data size range 3.

Specifically, each data size range corresponds to a random access request resource (for example, the data size range 1 corresponds to a PRACH resource 1; the data size range 2 corresponds to a PRACH resource 2; and the data size range 3 corresponds to a PRACH resource 3).

In the foregoing embodiment of this disclosure, configuration information for a random access procedure used for transmitting uplink data is obtained, where the configuration information is used for at least one data size range and the random access request resource corresponding to each data size range. According to the configuration information, a random access request resource corresponding to a data size range of uplink data is selected, so as to support transmission of various types of uplink data of different sizes during the random access procedure, and improve efficiency of transmission of various types of uplink data.

Further, the random access request resource includes at least one of the following:
 a time-frequency resource corresponding to a random access request, such as a random access channel resource (RACH Resource, RO) 1 or a physical uplink shared channel resource (PUSCH Resource, PO) 1;
 a downlink signal corresponding to the random access request, such as CSI-RS-1 (Channel State Information Reference Signal) and/or SSB-1 (Synchronous Signal Block);
 a cell corresponding to the random access request, for example, a cell Cell-1;
 an uplink carrier corresponding to the random access request, such as supplementary uplink (SUL) or normal uplink (NUL); and
 a code resource corresponding to the random access request, for example, a numbering range [1,10] of random access preamble for PRACH.

Further, a type of the random access procedure used for transmitting uplink data includes at least one of the following:
 a 4-step random access procedure in which the third message is used for sending uplink data through a data bearer (Data Radio Bearer, DRB);
 a 4-step random access procedure in which the third message is used for sending uplink data through a signaling bearer (Signaling Radio Bearer, SRB);
 a 2-step random access procedure in which the first message is used for sending uplink data through a data bearer DRB; and
 a 2-step random access procedure in which the first message is used for sending uplink data through a signaling bearer SRB.

Further, the step 202 may specifically include:
 selecting at least one of a first random access request resource and a second random access request resource; where
 the first random access request resource is selected before the data size range is determined, or the second random access request resource is selected after the data size range is determined; and
 at least one of the first random access request resource and the second random access request resource corresponds to all or part of the random access request resource corresponding to the data size range.

Further, the selecting the first random access request resource and the second random access request resource includes:
 selecting the first random access request resource, selecting the data size range, and then selecting the second random access request resource.

An order in which the terminal selects the data size range in the random access procedure may be in the following manners:

Manner 1: In a case that the first random access request resource includes an uplink carrier, the selecting the first random access request resource may include: in a case that a plurality of uplink carriers of one cell are configured for the random access request resource (where the network device also configures a random access resource selection rule for the plurality of uplink carriers) and different data size ranges are configured (where the network device also configures a data size range selection rule), the terminal first selects an uplink carrier corresponding to the random access procedure and then selects a data size range corresponding to the random access procedure.

For example, the random access resource selection rule for the plurality of uplink carriers that is configured by the network is: selection based on a measurement threshold for a downlink signal (for example, the threshold is =80 dBm); and the data size range selection rule is that the terminal may select a corresponding data size range greater than or equal to that of the uplink data to be sent by the terminal. In the random access procedure, the terminal first selects the uplink carrier according to the random access resource selection rule for the plurality of uplink carriers that is configured by the network, for example, if a reference signal received power (RSRP) measurement value for a cell 1 of the terminal is =60 dBm, the terminal selects a carrier 1; and if a size of the third message in the random access procedure of the terminal is 50 bits, the terminal selects the data size range 1, the data size range 2, and the data size range 3 according to the data size range selection rule configured by the network.

In manner 1, if the terminal selects a plurality of carriers according to the random access resource selection rule for the uplink carrier (for example, three uplink carriers are configured for the terminal, a cell RSRP measurement threshold is −80 dBm, a cell RSRP measurement result obtained through measurement by the terminal is −60 dBm, and the number of uplink carriers exceeding the threshold is 2), the terminal may first select a random access request resource according to the data size range selection rule. If there are still a plurality of uplink carriers corresponding to the random access request resource of the terminal, the terminal may select one uplink carrier out of selected uplink carriers; or the terminal may first select one uplink carrier from the selected uplink carriers, and then selects a corresponding random access request resource according to the data size range selection rule.

Manner 2: In a case that the second random access request resource includes an uplink carrier, the selecting the second random access request resource may include: in a case that a plurality of uplink carriers of one cell are configured for the random access request resource (where the network device also configures a random access resource selection rule for the plurality of uplink carriers) and different data size ranges are configured (where the network device also configures a data size range selection rule), the terminal first selects a data size range corresponding to the random access procedure and then selects an uplink carrier corresponding to the random access procedure.

For example, the random access resource selection rule for the plurality of uplink carriers that is configured by the network is: selection based on a measurement threshold for a downlink signal (for example, the threshold is −80 dBm); and the data size range selection rule is that the terminal may select a corresponding data size range greater than or equal to that of the uplink data to be sent by the terminal. In the random access procedure, if a size of the third message in the random access procedure of the terminal is 50 bits based on the type of the random access procedure used for sending the uplink data, the terminal selects the data size range 1, the data size range 2, and the data size range 3 according to the data size range selection rule. Then, according to the random access resource selection rule for the plurality of uplink carriers that is configured by the network, the terminal selects an uplink carrier. For example, if the RSRP measurement value for the cell 1 of the terminal is −60 dBm, the terminal may select the carrier 1.

In manner 2, if the terminal selects, according to the data size range selection rule, a random access request resource corresponding to the data size range, and there is one uplink carrier corresponding to the random access request resource, the terminal no more executes the random access request resource selection rule for the plurality of uplink carriers (for example, all random access request resources corresponding to the 2-step random access procedure and selected by the terminal are on the carrier 1, and then the terminal no longer selects the uplink carrier in this case). This can avoid selection conflicts (for example, in a case that the measurement result of the cell 1 of the terminal is less than the threshold and the uplink carrier 1 is not selected) to avoid a failure of the random access procedure.

Manner 3: In a case that the first random access request resource includes a downlink signal, the selecting the first random access request resource may include: in a case that a downlink signal is configured for the random access request resource (where the network device also configures a downlink signal selection rule) and different data size ranges are configured (where the network device also configures a data size range selection rule), the terminal first selects a downlink signal corresponding to the random access procedure and then selects a data size range corresponding to the random access procedure.

For example, the downlink signal selection rule configured by the network is: selection based on a measurement threshold for a synchronization signal (Synchronization Signal and PBCH block, SSB) (for example, the threshold is −80 dBm); and the data size range selection rule is that the terminal may select a corresponding data size range greater than or equal to that of the uplink data to be sent by the terminal. In the random access procedure, the terminal first selects the downlink signal according to the downlink signal selection rule configured by the network, for example, if an RSRP measurement value for a cell 1 of the terminal is −60 dBm, the terminal selects an SSB1; and if a size of the third message in the random access procedure of the terminal is 50 bits, the terminal selects the data size range 1, the data size range 2, and the data size range 3 according to the data size range selection rule configured by the network.

In manner 3, in a case that the terminal selects a plurality of downlink signals according to the downlink signal selection rule (for example, if a random access request resource corresponding to three SSBs is configured for the terminal, and there are two SSBs exceeding the RSRP threshold configured by the network, the terminal selects two SSBs), the terminal may first select, according to the data size range selection rule, a random access request resource corresponding to the random access procedure. If there are still a plurality of downlink signals corresponding to the random access request resource of the terminal, the terminal selects one downlink signal out of selected downlink signals; or the terminal first selects one downlink signal out of selected downlink signals, and then selects, according to the data size range selection rule, a random access request resource corresponding to the random access procedure. If the downlink signal is only used for one of the data size ranges, the terminal may no longer select, according to the data size range selection rule, the random access request resource corresponding to the random access procedure, thereby avoiding conflicts of downlink signal selection.

Manner 4: In a case that the second random access request resource includes a downlink signal, the selecting the second random access request resource may include: in a case that a downlink signal is configured for the random access request resource (where the network device also configures a downlink signal selection rule) and different data size ranges are configured (where the network device also configures a data size range selection rule), the terminal first selects a data size range corresponding to the random access procedure and then selects a downlink signal corresponding to the random access procedure.

For example, the downlink signal selection rule configured by the network is: selection based on a measurement threshold for an SSB (for example, the threshold is −80 dBm); and the data size range selection rule is that the terminal may select a corresponding data size range greater than or equal to that of the uplink data to be sent by the terminal. In the random access procedure, if a size of the third message in the random access procedure of the terminal is 50 bits, the terminal selects the data size range 1, the data size range 2, and the data size range 3 according to the data size range selection rule. Then, a downlink signal is selected according to the downlink signal selection rule configured by the network. For example, if an RSRP measurement value of an SSB1 in the cell 1 of the terminal is −60 dBm, the UE selects the SSB1.

In manner 4, the terminal selects, according to the data size range selection rule, the random access request resource corresponding to the data size range. If the random access request resource corresponds to one downlink signal, the terminal may no longer execute the downlink signal selection rule. For example, a random access request resource corresponding to the data size range 1 and selected by the terminal corresponds to the SSB1; in this case, the terminal no longer executes the downlink signal selection rule, thereby avoiding conflicts of downlink signal selection.

Manner 5: In a case that the first random access request resource includes a time-frequency resource, the selecting the first random access request resource includes: in a case that a same time-frequency resource is configured for different data size ranges and different code resources are configured (for example, a different preamble numbering range for a PRACH), the terminal first selects the target time-frequency resource from the time-frequency resource, and then selects the data size range.

For example, the data size range 1, data size range 2 and data size range 3 that are configured by the network correspond to a same RO, a preamble coding number [0,10] for PRACH is used for the data size range 1, a preamble coding number [11,20] for PRACH is used for the data size range 2, and a preamble coding number [21,30] for PRACH is used for the data size range 3. The data size range selection rule is that the terminal may select a corresponding data size range greater than or equal to that of the uplink data to be sent by the terminal. In the random access procedure, the terminal first selects one target time-frequency resource (a specific RO, such as RO1) based on a time-frequency resource (RO) configured by the network; and then, if a size of the third message in the random access procedure of the terminal is 50 bits, the terminal selects the data size range 1, the data size range 2, and the data size range 3 according to the data size range selection rule configured by the network.

Manner 6: In a case that the second random access request resource includes a time-frequency resource, the selecting the second random access request resource includes: in a case that a same time-frequency resource is configured for different data size ranges and different code resources are configured (for example, a different preamble numbering range for a PRACH), the terminal first selects the data size range, and then selects the target time-frequency resource from the time-frequency resource.

For example, the data size range 1, data size range 2 and data size range 3 that are configured by the network correspond to a same RO, a preamble coding number [0,10] for PRACH is used for the data size range 1, a preamble coding number [11,20] for PRACH is used for the data size range 2, and a preamble coding number [21,30] for PRACH is used for the data size range 3. The data size range selection rule is that the terminal may select a corresponding data size range greater than or equal to that of the uplink data to be sent by the terminal. In the random access procedure, if a size of the third message in the random access procedure of the terminal is 50 bits, the terminal first selects the data size range 1, the data size range 2, and the data size range 3 according to the data size range selection rule configured by the network; and then the terminal selects one target time-frequency resource (a specific RO, such as RO1) based on a time-frequency resource (RO) configured by the network.

In the foregoing manners, a maximum of one manner is selected from manners 1 and 2, a maximum of one manner is selected from manners 3 and 4, and a maximum of one manner is selected from manners 5 and 6. For example, manner 1 and manner 3 may be selected, that is, first selecting an uplink carrier, then selecting a downlink signal, and finally selecting a data size range. Alternatively, manner 1 and manner 4 may be selected, that is, first selecting an uplink carrier, then selecting a data size range, and finally selecting a downlink signal. Alternatively, manner 2 and manner 3 may be selected, that is, first selecting a downlink signal, then selecting a data size range, and finally selecting an uplink carrier. Alternatively, manner 2 and manner 4 may be selected, that is, first selecting a data size range, then selecting an uplink carrier, and finally selecting a downlink signal; or first selecting a data size range, then selecting a downlink signal, and finally selecting an uplink carrier. Alternatively, manner 1, manner 3, and manner 6 may be selected, that is, first selecting an uplink carrier, selecting a downlink signal, then selecting a data size range, and finally selecting a target time-frequency resource from the time-frequency resources. The selection manner includes not only a combination of the foregoing manners.

Specifically, the random access resource selection rule for the plurality of uplink carriers is: selection based on a measurement threshold for the downlink signal, for example, an RSRP measurement threshold for two uplink carriers of a cell 1 is −80 dBm. When an RSRP measurement result of the cell 1 exceeds the threshold, an uplink carrier 1 is used; otherwise, an uplink carrier 2 is used.

The downlink signal selection rule is selection based on a measurement threshold for the downlink signal. For example, an RSRP measurement threshold for an SSB in the cell 1 is −80 dBm. When a measurement result for an SSB1 in the cell 1 exceeds the threshold, the terminal selects a random access resource corresponding to the SSB1.

Further, the data size range of the uplink data is selected in one of the following manners (namely, the data size range selection rule):

selecting at least one data size range capable of carrying the uplink data; where, for example, the data size range capable of carrying the uplink data to be sent by the terminal includes a data size range 1, a data size range 2, and a data size range 3, and then the terminal selects the data size range 1, the data size range 2, and the data size range 3;

selecting, from at least one data size range capable of carrying the uplink data, a data size range to which a size of the uplink data belongs; where, for example, the network device configures a data size range 1=[50,100] bits, a data size range 2=[101,200] bits, and a data size range 3=[201, 300] bits; different data size ranges 1 correspond to different random access request resources; and if the size of the uplink data to be sent by the terminal is 50 bits, the terminal selects the data size range 1 to which 50 bits belong;

selecting, from at least one data size range capable of carrying the uplink data, a data size range based on a signal strength; where, for example, the data size range capable of carrying the uplink data to be sent by the terminal includes a data size range 1, a data size range 2, and a data size range 3, and if an SSB (and/or CSI-RS) corresponding to the data size range 1 has a highest signal strength, the terminal selects the data size range 1; and selecting, from at least one data size range capable of carrying the uplink data, a data size range based on a random number; where, for example, the data size range capable of carrying the uplink data to be sent by the terminal includes a data size range 1, a data size range 2, and a data size range 3; and the terminal generates one random number between "0" and "1", with a random number [0,0.3] corresponding to the data size range 1, a random number [0.3,0.6] corresponding to the data size range 2, and a random number [0.6,1] corresponding to the data size range 3; or with a random number [0, 0.5] corresponding to the data size range 1 and data size range 2, and a random number [0.5,1] corresponding to the data size range 3.

Specifically, the data size range selection rule may be configured by the network device or prescribed by a protocol.

Further, in a case that a plurality of uplink carriers configured for the random access request resource conflict with an uplink carrier corresponding to the data size range, the selecting a random access request resource corresponding to a data size range of uplink data further includes any one of the following:
  reselecting an uplink carrier;
  reselecting a data size range;
  selecting one uplink carrier out of selected uplink carriers; and
  selecting one data size range out of selected data size ranges.

Specifically, in a case that a plurality of uplink carriers are configured for the random access request resource, if the terminal fails to select any uplink carrier in the foregoing selection manner 1 or manner 2, for example, there is an uplink carrier selection conflict (the terminal first selects an uplink carrier 1, and a random access request resource corresponding to the data size range selected by the terminal is not on the uplink carrier 1 after the terminal executes the data size range selection rule), the selecting a random access request resource corresponding to a data size range of uplink data further includes any one of the following:
  reselecting an uplink carrier, that is, the terminal ignores a selection result of the current time, and executes the random access request resource selection rule for the plurality of uplink carriers again;
  reselecting a data size range, that is, the terminal ignores a selection result of the current time, and executes the data size range selection rule again; and
  selecting one uplink carrier out of selected uplink carriers (which, for example, may be an uplink carrier corresponding to any contention-based random access request resource).

Specifically, in a case that a plurality of uplink carriers are configured for the random access request resource, if the terminal fails to select any data size range in the foregoing selection manner 1 or manner 2, for example, there is an uplink carrier selection conflict (the terminal first selects an uplink carrier 1, and a random access request resource corresponding to the data size range selected by the terminal is not on the uplink carrier 1 after the terminal executes the data size range selection rule), the selecting a random access request resource corresponding to a data size range of uplink data further includes any one of the following:
  reselecting an uplink carrier, that is, the terminal ignores a selection result of the current time, and executes the random access request resource selection rule for the plurality of uplink carriers again;
  reselecting a data size range, that is, the terminal ignores a selection result of the current time, and executes the data size range selection rule again; and
  selecting one data size range out of selected data size ranges (which, for example, may be a data size range corresponding to any contention-based random access request resource).

Further, in a case that a plurality of downlink signals configured for the random access request resource conflict with a downlink signal corresponding to the data size range, the selecting a random access request resource corresponding to a data size range of uplink data further includes any one of the following:
  reselecting a downlink signal;
  reselecting a data size range;
  selecting one downlink signal out of selected downlink signals; and
  selecting one data size range out of selected data size ranges.

Specifically, in a case that a plurality of downlink signals are configured for the random access request resource, if the terminal fails to select any downlink signal in manner 3 or manner 4, for example, there is a downlink signal selection conflict (the terminal first selects an SSB 1 according to the downlink signal selection rule; however, a random access request resource corresponding to the data size range selected by the terminal is not corresponding to the SSB 1 after the terminal executes the data size range selection rule), the selecting a random access request resource corresponding to a data size range of uplink data further includes any one of the following:
  reselecting a downlink signal, that is, the terminal ignores a selection result of the current time, and executes the downlink signal selection rule again;
  reselecting a data size range, that is, the terminal ignores a selection result of the current time, and executes the data size range selection rule again; and
  selecting one downlink signal out of selected downlink signals (which, for example, may be a downlink signal corresponding to any contention-based random access request resource).

Specifically, in a case that a plurality of downlink signals are configured for the random access request resource, if the terminal fails to select any data size range in manner 3 or manner 4, for example, there is a downlink signal selection conflict (the terminal first selects an SSB 1 according to the downlink signal selection rule; however, a random access request resource corresponding to the data size range selected by the terminal is not corresponding to the SSB 1 after the terminal executes the data size range selection rule), the selecting a random access request resource corresponding to a data size range of uplink data further includes any one of the following:
  reselecting a downlink signal, that is, the terminal ignores a selection result of the current time, and executes the downlink signal selection rule again;
  reselecting a data size range, that is, the terminal ignores a selection result of the current time, and executes the data size range selection rule again; and
  selecting one data size range out of selected data size ranges (which, for example, may be a data size range corresponding to any contention-based random access request resource).

Further, after the step 202, the method may further include:
  selecting a specific random access request resource from one or more random access request resources corresponding to the data size range, to send random access request information.

For example, if the terminal selects the data size range 1, the terminal selects a specific PRACH resource from a PRACH resource(s) corresponding to the 4-step random access procedure of the random access procedure, and sends random access request information Msg1. If the terminal selects the data size range 2, the terminal selects a specific PRACH resource (and/or PUSCH resource) from a PRACH resource(s) (and/or PUSCH resource) corresponding to the 2-step random access procedure of the random access procedure, and sends random access request information MsgA.

Specifically, if the terminal selects a plurality of data size ranges, the terminal may select, from a random access request resource set of a plurality of random access request resources corresponding to the plurality of data size ranges, one most recently available random access request, that is, one available random access request resource that is closest to a selection time point of the random access request resource; or randomly select one random access request resource from a plurality of continuous random access request resources in a plurality of random access request resource sets corresponding to the plurality of data size ranges. For example, for random access request resource sets corresponding to the data size range 1 and data size range 2, a next random access request resource adjacent to the selection time point of the random access request resource belongs to a segment of continuous random access request resources, and then the terminal randomly selects one random access request resource from the continuous random access request resources. For example, there are four resources, namely RO1/RO2/RO3/RO4 (and/or PO1/PO2/PO3/PO4) in slots 1 and 2, and a result of random selection may be RO1 (and/or PO1).

In this embodiment of this disclosure, configuration information for a random access procedure used for transmitting uplink data is obtained, where the configuration information is used for at least one data size range and a random access request resource corresponding to each data size range. According to the configuration information, a random access request resource corresponding to a data size range of uplink data is selected, so as to support transmission of various types of uplink data of different sizes during the random access procedure, and improve efficiency of transmission of various types of uplink data.

Figure 3:
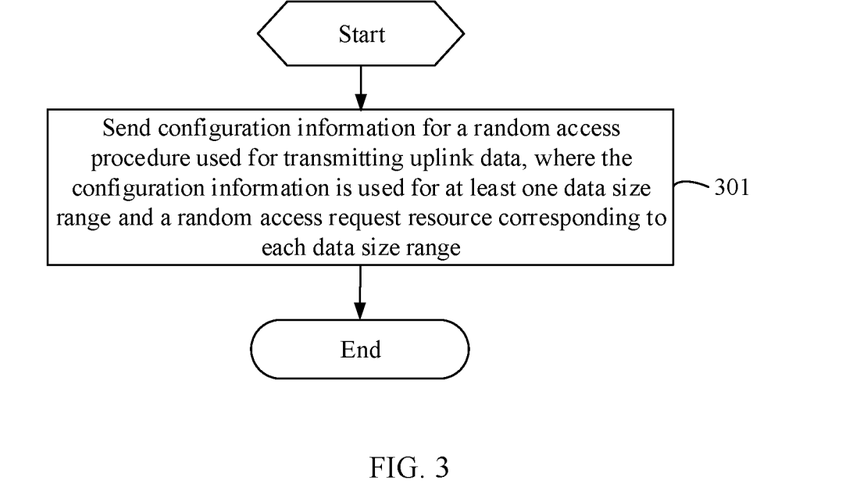
FIG. 3 is a schematic flowchart of a method for selecting a random access request resource according to an embodiment of this disclosure.

As shown in FIG. 3, an embodiment of this disclosure further provides a method for selecting a random access request resource, applied to a network device and including:

Step 301: Send configuration information for a random access procedure used for transmitting uplink data, where the configuration information is used for at least one data size range and a random access request resource corresponding to each data size range.

In this embodiment of this disclosure, the network device sends, to the terminal, configuration information for a random access procedure used for transmitting uplink data, where the configuration information is used for at least one data size range and a random access request resource corresponding to each data size range. In this way, the terminal may select, according to the configuration information, a random access request resource corresponding to a data size range of uplink data, so as to support transmission of various types of uplink data of different sizes during the random access procedure, and improve efficiency of transmission of various types of uplink data.

Further, the random access request resource includes at least one of the following:
- a time-frequency resource corresponding to a random access request;
- a downlink signal corresponding to the random access request;
- a cell corresponding to the random access request;
- an uplink carrier corresponding to the random access request; and
- a code resource corresponding to the random access request.

Further, a type of the random access procedure used for transmitting uplink data includes at least one of the following:
- a 4-step random access procedure in which the third message is used for sending uplink data through a data bearer DRB;
- a 4-step random access procedure in which the third message is used for sending uplink data through a signaling bearer SRB;
- a 2-step random access procedure in which the first message is used for sending uplink data through a data bearer DRB; and
- a 2-step random access procedure in which the first message is used for sending uplink data through a signaling bearer SRB.

In the foregoing embodiment of this disclosure, the network device sends, to the terminal, configuration information for a random access procedure used for transmitting uplink data, where the configuration information is used for at least one data size range and a random access request resource corresponding to each data size range. In this way, the terminal may select, according to the configuration information, a random access request resource corresponding to a data size range of uplink data, so as to support transmission of various types of uplink data of different sizes during the random access procedure, and improve efficiency of transmission of various types of uplink data.

Figure 4:
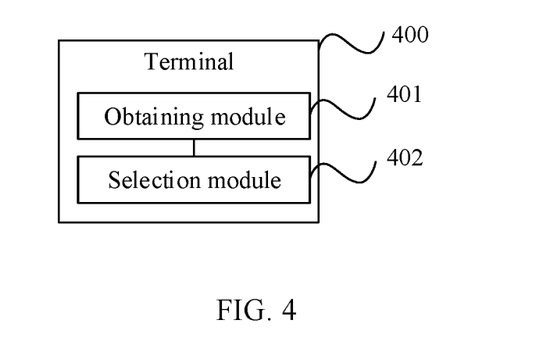
FIG. 4 is a schematic modular diagram of a terminal according to an embodiment of this disclosure.

FIG. 4 is a schematic modular diagram of a terminal according to an embodiment of this disclosure. As shown in FIG. 4, an embodiment of this disclosure further provides a terminal 400, including:
- an obtaining module 401, configured to obtain configuration information for a random access procedure used for transmitting uplink data, where the configuration information is used for at least one data size range and a random access request resource corresponding to each data size range; and
- a selection module 402, configured to select, according to the configuration information, a random access request resource corresponding to a data size range of uplink data.

Optionally, the random access request resource includes at least one of the following:
- a time-frequency resource corresponding to a random access request;
- a downlink signal corresponding to the random access request;
- a cell corresponding to the random access request;
- an uplink carrier corresponding to the random access request; and
- a code resource corresponding to the random access request.

Optionally, a type of the random access procedure used for transmitting uplink data includes at least one of the following:
- a 4-step random access procedure in which the third message is used for sending uplink data through a data bearer DRB;
- a 4-step random access procedure in which the third message is used for sending uplink data through a signaling bearer SRB;
- a 2-step random access procedure in which the first message is used for sending uplink data through a data bearer DRB; and
- a 2-step random access procedure in which the first message is used for sending uplink data through a signaling bearer SRB.

Optionally, the selection module 402 includes:
- a selection unit, configured to select at least one of a first random access request resource and a second random access request resource; where
- the first random access request resource is selected before the data size range is determined, or the second random access request resource is selected after the data size range is determined; and
- at least one of the first random access request resource and the second random access request resource corresponds to all or part of the random access request resource corresponding to the data size range.

Optionally, in a case that the first random access request resource includes an uplink carrier, the selection unit is configured to:
  in a case that random access request resources are configured with a plurality of uplink carriers of one cell and different data size ranges, select the uplink carrier, and then select the data size range.

Optionally, in a case that the second random access request resource includes an uplink carrier, the selection unit is configured to:
  in a case that random access request resources are configured with a plurality of uplink carriers of one cell and different data size ranges, select the data size range, and then select the uplink carrier.

Optionally, in a case that the first random access request resource includes a downlink signal, the selection unit is configured to:
  in a case that random access request resources are configured with downlink signals and different data size ranges, select the downlink signal, and then select the data size range.

Optionally, in a case that the second random access request resource includes a downlink signal, the selection unit is configured to:
  in a case that random access request resources are configured with downlink signals and different data size ranges, select the data size range, and then select the downlink signal.

Optionally, in a case that the first random access request resource includes a time-frequency resource, the selection unit is configured to:
  in a case that same time-frequency resources are configured for different data size ranges and different code resources are configured, select a target time-frequency resource from the time-frequency resources, and then select the data size range.

Optionally, in a case that the second random access request resource includes a time-frequency resource, the selection unit is configured to:
  in a case that same time-frequency resources are configured for different data size ranges and different code resources are configured, select the data size range, and then select a target time-frequency resource from the time-frequency resources.

Optionally, the selection unit is configured to:
  select the first random access request resource, select the data size range, and then select the second random access request resource.

Optionally, the data size range of the uplink data is selected in one of the following manners:
  selecting at least one data size range capable of carrying the uplink data;
  selecting, from at least one data size range capable of carrying the uplink data, a data size range to which a size of the uplink data belongs;
  selecting, from at least one data size range capable of carrying the uplink data, a data size range based on a signal strength; and
  selecting, from at least one data size range capable of carrying the uplink data, a data size range based on a random number.

Optionally, in a case that a plurality of uplink carriers configured for the random access request resource conflict with an uplink carrier corresponding to the data size range, the selection module 402 is further configured to do any one of the following:
  reselect an uplink carrier;
  reselect a data size range;
  select one uplink carrier out of selected uplink carriers; and
  select one data size range out of selected data size ranges.

Optionally, in a case that a plurality of downlink signals configured for the random access request resource conflict with a downlink signal corresponding to the data size range, the selection module is further configured to do any one of the following:
  reselect a downlink signal;
  reselect a data size range;
  select one downlink signal out of selected downlink signals; and
  select one data size range out of selected data size ranges.

In the foregoing embodiment of this disclosure, configuration information for a random access procedure used for transmitting uplink data is obtained, where the configuration information is used for at least one data size range and a random access request resource corresponding to each data size range. According to the configuration information, a random access request resource corresponding to a data size range of uplink data is selected, so as to support transmission of various types of uplink data of different sizes during the random access procedure, and improve efficiency of transmission of various types of uplink data.

An embodiment of this disclosure further provides a terminal, including a memory, a processor, and a computer program stored in the memory and capable of running on the processor. When the computer program is executed by the processor, the processes of the foregoing embodiment of the method for selecting a random access request resource applied to the terminal are implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for selecting a random access request resource applied to the terminal can be implemented, with the same technical effects achieved. To avoid repetition, details are not described herein again. The computer-readable storage medium is, for example, a read-only memory (ROM), a random access memory (RAM), a magnetic disk, or an optical disc.

Figure 5:
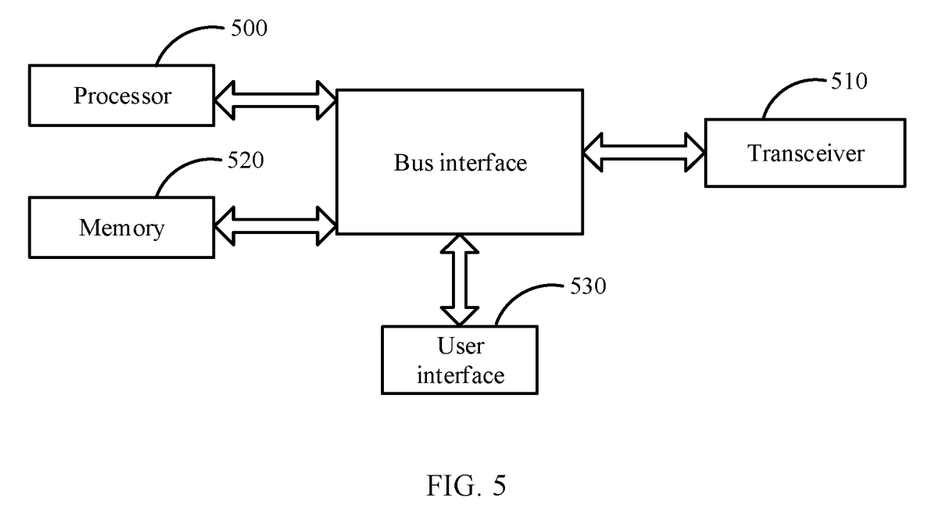
FIG. 5 is a first structural block diagram of a terminal according to an embodiment of this disclosure.

For better achieving the foregoing objective, as shown in FIG. 5, an embodiment of this disclosure further provides a terminal, including a memory 520, a processor 500, a transceiver 510, a user interface 530, a bus interface, and a computer program stored in the memory 520 and capable of running on the processor 500, where the processor 500 is configured to read the program in the memory 520 to perform the following processes:
  obtaining configuration information for a random access procedure used for transmitting uplink data, where the configuration information is used for at least one data size range and a random access request resource corresponding to each data size range; and
  selecting, according to the configuration information, a random access request resource corresponding to a data size range of uplink data.

In FIG. 5, a bus architecture may include any quantity of interconnected buses and bridges, and specifically connects together circuits that are of one or more processors represented by the processor 500 and of a memory represented by the memory 520. The bus architecture may further interconnect various other circuits such as a peripheral device, a voltage regulator, and a power management circuit. These are all well known in the art, and therefore are not further described in this specification. The bus interface provides an interface. The transceiver 510 may be a plurality of components, that is, the transceiver 510 includes a transmitter and a receiver, and provides a unit for communicating with various other apparatuses on a transmission medium. For different user equipments, the user interface 530 may also be an interface that can be externally or internally connected to a required device. The connected device includes but is not limited to a keypad, a display, a speaker, a microphone, a joystick, and the like.

The processor 500 is responsible for management of the bus architecture and general processing, and the memory 520 is capable of storing data that is used by the processor 500 during operation.

Optionally, the random access request resource includes at least one of the following:
  a time-frequency resource corresponding to a random access request;
  a downlink signal corresponding to the random access request;
  a cell corresponding to the random access request;
  an uplink carrier corresponding to the random access request; and
  a code resource corresponding to the random access request.

Optionally, a type of the random access procedure used for transmitting uplink data includes at least one of the following:
  a 4-step random access procedure in which the third message is used for sending uplink data through a data bearer DRB;
  a 4-step random access procedure in which the third message is used for sending uplink data through a signaling bearer SRB;
  a 2-step random access procedure in which the first message is used for sending uplink data through a data bearer DRB; and
  a 2-step random access procedure in which the first message is used for sending uplink data through a signaling bearer SRB.

Optionally, the selecting a random access request resource corresponding to a data size range of uplink data includes:
  selecting at least one of a first random access request resource and a second random access request resource; where
  the first random access request resource is selected before the data size range is determined, or the second random access request resource is selected after the data size range is determined; and
  at least one of the first random access request resource and the second random access request resource corresponds to all or part of the random access request resource corresponding to the data size range.

Optionally, in a case that the first random access request resource includes an uplink carrier, the selecting the first random access request resource includes:
  in a case that random access request resources are configured with a plurality of uplink carriers of one cell and different data size ranges, selecting the uplink carrier, and then selecting the data size range.

Optionally, in a case that the second random access request resource includes an uplink carrier, the selecting the second random access request resource includes:
  in a case that random access request resources are configured with a plurality of uplink carriers of one cell and different data size ranges, selecting the data size range, and then selecting the uplink carrier.

Optionally, in a case that the first random access request resource includes a downlink signal, the selecting the first random access request resource includes:
  in a case that random access request resources are configured with downlink signals and different data size ranges, selecting the downlink signal, and then selecting the data size range.

Optionally, in a case that the second random access request resource includes a downlink signal, the selecting the second random access request resource includes:
  in a case that random access request resources are configured with downlink signals and different data size ranges, selecting the data size range, and then selecting the downlink signal.

Optionally, in a case that the first random access request resource includes a time-frequency resource, the selecting the first random access request resource includes:
  in a case that same time-frequency resources are configured for different data size ranges and different code resources are configured, selecting a target time-frequency resource from the time-frequency resources, and then selecting the data size range.

Optionally, in a case that the second random access request resource includes a time-frequency resource, the selecting the second random access request resource includes:
  in a case that same time-frequency resources are configured for different data size ranges and different code resources are configured, selecting the data size range, and then selecting a target time-frequency resource from the time-frequency resources.

Optionally, the selecting the first random access request resource and the second random access request resource includes:
  selecting the first random access request resource, selecting the data size range, and then selecting the second random access request resource.

Optionally, the data size range of the uplink data is selected in one of the following manners:
  selecting at least one data size range capable of carrying the uplink data;
  selecting, from at least one data size range capable of carrying the uplink data, a data size range to which a size of the uplink data belongs;
  selecting, from at least one data size range capable of carrying the uplink data, a data size range based on a signal strength; and
  selecting, from at least one data size range capable of carrying the uplink data, a data size range based on a random number.

Optionally, in a case that a plurality of uplink carriers configured for the random access request resource conflict with an uplink carrier corresponding to the data size range, the selecting a random access request resource corresponding to a data size range of uplink data further includes any one of the following:
  reselecting an uplink carrier;
  reselecting a data size range;
  selecting one uplink carrier out of selected uplink carriers; and
  selecting one data size range out of selected data size ranges.

Optionally, in a case that a plurality of downlink signals configured for the random access request resource conflict with a downlink signal corresponding to the data size range, the selecting a random access request resource corresponding to a data size range of uplink data further includes any one of the following:
reselecting a downlink signal;
reselecting a data size range;
selecting one downlink signal out of selected downlink signals; and
selecting one data size range out of selected data size ranges.

In the foregoing embodiment of this disclosure, configuration information for a random access procedure used for transmitting uplink data is obtained, where the configuration information is used for at least one data size range and a random access request resource corresponding to each data size range. According to the configuration information, a random access request resource corresponding to a data size range of uplink data is selected, so as to support transmission of various types of uplink data of different sizes during the random access procedure, and improve efficiency of transmission of various types of uplink data.

The terminal in this embodiment of this disclosure is capable of implementing all implementations in the embodiment of the method for selecting a random access request resource applied to the terminal, with the same effects achieved. Details are not repeated herein.

Figure 6:
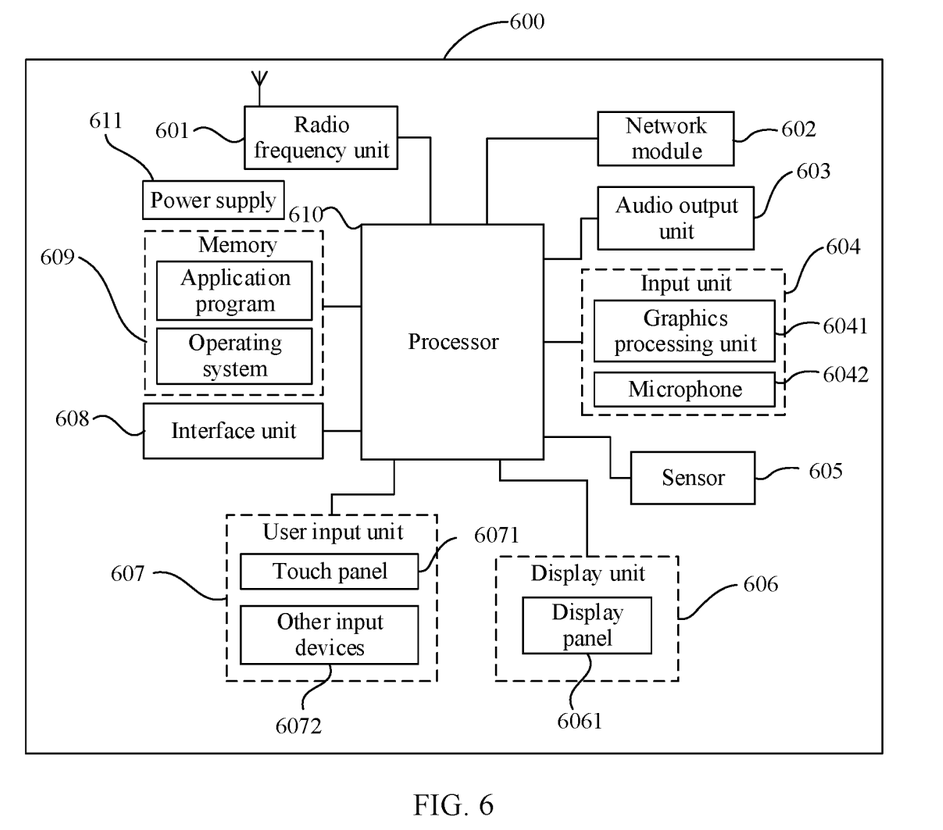
FIG. 6 is a second structural block diagram of a terminal according to an embodiment of this disclosure.

FIG. 6 is a schematic structural diagram of hardware of a terminal for implementing the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal device. The terminal may include more or fewer components than those shown in the figure, or a combination of some components, or the components disposed differently. In this embodiment of this disclosure, the terminal includes, but is not limited to, a mobile phone, a tablet computer, a laptop computer, a personal digital assistant, an in-vehicle terminal, a wearable device, a pedometer, and the like.

The processor 610 is configured to: obtain configuration information for a random access procedure used for transmitting uplink data, where the configuration information is used for at least one data size range and a random access request resource corresponding to each data size range; and
select, according to the configuration information, a random access request resource corresponding to a data size range of uplink data.

In the foregoing technical solutions of the embodiments of this disclosure, configuration information for a random access procedure used for transmitting uplink data is obtained, where the configuration information is used for at least one data size range and a random access request resource corresponding to each data size range. According to the configuration information, a random access request resource corresponding to a data size range of uplink data is selected, so as to support transmission of various types of uplink data of different sizes during the random access procedure, and improve efficiency of transmission of various types of uplink data.

It should be understood that in this embodiment of this disclosure, the radio frequency unit 601 may be configured to receive and send information, or to receive and send a signal in a call process, and specially, after receiving downlink data from a network device, send the downlink data to the processor 610 for processing; and also send uplink data to the network device. Generally, the radio frequency unit 601 includes, but is not limited to, an antenna, at least one amplifier, a transceiver, a coupler, a low noise amplifier, a duplexer, and the like. In addition, the radio frequency unit 601 may also communicate with a network and other devices via a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or be transmitted by the radio frequency unit 601 or the network module 602. The microphone 6042 is capable of receiving sounds and processing such sounds into audio data. The processed audio data can be converted into a format output that can be sent to a mobile communication network device through the radio frequency unit 601 in a telephone call mode.

The mobile terminal 600 may further include at least one sensor 605, for example, a light sensor, a motion sensor, and another sensor. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (LCD), an organic light-emitting diode (OLED), or the like.

The user input unit 607 may be configured to: receive a digit or character information that is input, and generate signal input related to user settings and function control of the terminal. Specifically, the user input unit 607 may include a touch panel 6071 and other input devices 6072.

The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 610, and can receive a command transmitted by the processor 610 and execute the command In addition, the touch panel 6071 may be implemented in a plurality of forms, for example, as a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or an on/off key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. In FIG. 6, the touch panel 6071 and the display panel 6061 serve as two independent components to implement input and output functions of the terminal. In some embodiments, however, the touch panel 6071 may be integrated with the display panel 6061 to implement the input and output functions of the terminal. This is not specifically limited herein.

The interface unit 608 is an interface between an external apparatus and the terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to: receive input (for example, data information and power) from the external apparatus, and transmit the received input to one or more elements in the terminal 600, or may be configured to transmit data between the terminal 600 and the external apparatus.

The memory 609 may be configured to store software programs and various data. The memory 609 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory such as at least one disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, an application processor and a modem processor may be integrated in the processor 610. The application processor primarily processes an operating system, user interfaces, application programs, and the like. The modem processor primarily processes radio communication. It can be understood that the modem processor may alternatively be not integrated in the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not illustrated. Details are not described herein.

Figure 7:
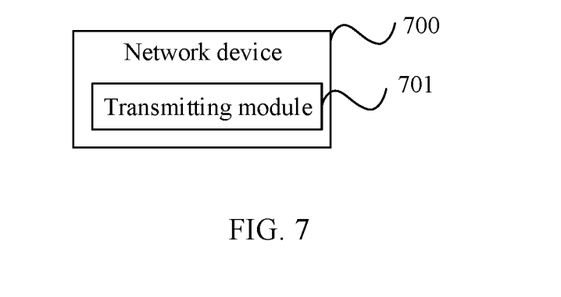
FIG. 7 is a schematic modular diagram of a network device according to an embodiment of this disclosure.

As shown in FIG. 7, an embodiment of this disclosure further provides a network device 700, including:

a transmitting module 701, configured to send configuration information for a random access procedure used for transmitting uplink data, where the configuration information is used for at least one data size range and a random access request resource corresponding to each data size range.

Optionally, the random access request resource includes at least one of the following:

a time-frequency resource corresponding to a random access request;

a downlink signal corresponding to the random access request;

a cell corresponding to the random access request;

an uplink carrier corresponding to the random access request; and a code resource corresponding to the random access request.

Optionally, a type of the random access procedure used for transmitting uplink data includes at least one of the following:

a 4-step random access procedure in which the third message is used for sending uplink data through a data bearer DRB;

a 4-step random access procedure in which the third message is used for sending uplink data through a signaling bearer SRB;

a 2-step random access procedure in which the first message is used for sending uplink data through a data bearer DRB; and a 2-step random access procedure in which the first message is used for sending uplink data through a signaling bearer SRB.

In the foregoing embodiment of this disclosure, the network device sends, to the terminal, configuration information for a random access procedure used for transmitting uplink data, where the configuration information is used for at least one data size range and a random access request resource corresponding to each data size range. In this way, the terminal may select, according to the configuration information, a random access request resource corresponding to a data size range of uplink data, so as to support transmission of various types of uplink data of different sizes during the random access procedure, and improve efficiency of transmission of various types of uplink data.

An embodiment of this disclosure further provides a network device, including a memory, a processor, and a computer program stored in the memory and capable of running on the processor. When the computer program is executed by the processor, the processes of the foregoing embodiment of the method for selecting a random access request resource applied to the network device are implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for selecting a random access request resource applied to the network device can be implemented, with the same technical effects achieved. To avoid repetition, details are not described herein again. The computer-readable storage medium is, for example, a read-only memory (ROM), a random access memory (RAM), a magnetic disk, or an optical disc.

Figure 8:
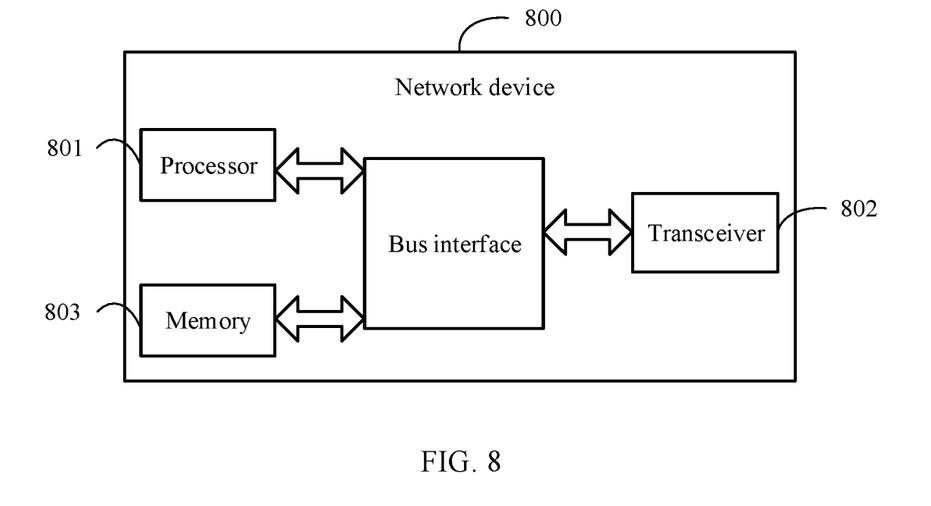
FIG. 8 is a structural block diagram of a network device according to an embodiment of this disclosure.

As shown in FIG. 8, an embodiment of this disclosure further provides a network device 800, including a processor 801, a transceiver 802, a memory 803, and a bus interface, where the processor 801 is configured to read a program in the memory 803 and further execute the following process:

sending configuration information for a random access procedure used for transmitting uplink data, where the configuration information is used for at least one data size range and a random access request resource corresponding to each data size range.

In FIG. 8, a bus architecture may include any quantity of interconnected buses and bridges, specifically for interconnecting various circuits of one or more processors represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, that is, the transceiver 802 includes a transmitter and a receiver, and provides a unit for communicating with various other apparatuses on a transmission medium.

Optionally, the random access request resource includes at least one of the following:
a time-frequency resource corresponding to a random access request;
a downlink signal corresponding to the random access request;
a cell corresponding to the random access request;
an uplink carrier corresponding to the random access request; and
a code resource corresponding to the random access request.

Optionally, a type of the random access procedure used for transmitting uplink data includes at least one of the following:
a 4-step random access procedure in which the third message is used for sending uplink data through a data bearer DRB;
a 4-step random access procedure in which the third message is used for sending uplink data through a signaling bearer SRB;
a 2-step random access procedure in which the first message is used for sending uplink data through a data bearer DRB; and
a 2-step random access procedure in which the first message is used for sending uplink data through a signaling bearer SRB.

In the foregoing embodiment of this disclosure, the network device sends, to the terminal, configuration information for a random access procedure used for transmitting uplink data, where the configuration information is used for at least one data size range and a random access request resource corresponding to each data size range. In this way, the terminal may select, according to the configuration information, a random access request resource corresponding to a data size range of uplink data, so as to support transmission of various types of uplink data of different sizes during the random access procedure, and improve efficiency of transmission of various types of uplink data.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for selecting a random access request resource, applied to a terminal and comprising:
obtaining configuration information for a random access procedure used for transmitting uplink data, wherein the configuration information is used for configuring at least one data size range and a random access request resource corresponding to each data size range; and
selecting, according to the configuration information, a random access request resource corresponding to a data size range of uplink data;
wherein the selecting the random access request resource corresponding to the data size range of the uplink data comprises:

first selecting an uplink carrier corresponding to the random access procedure, and then selecting a downlink signal, and then selecting the data size range corresponding to the random access procedure, and then selecting a numbering range of the random access preamble for PRACH corresponding to the data size range, and then selecting a target time-frequency resource;

wherein the uplink carrier comprises at least one of supplementary uplink (SUL) carrier or normal uplink (NUL) carrier.

2. The method for selecting a random access request resource according to claim 1, wherein the random access request resource comprises at least one of the following:
   a time-frequency resource corresponding to a random access request;
   a downlink signal corresponding to the random access request;
   a cell corresponding to the random access request;
   an uplink carrier corresponding to the random access request; and
   a code resource corresponding to the random access request.

3. The method for selecting a random access request resource according to claim 1, wherein a type of the random access procedure used for transmitting uplink data comprises at least one of the following:
   a 4-step random access procedure in which the third message is used for sending uplink data through a data bearer DRB;
   a 4-step random access procedure in which the third message is used for sending uplink data through a signaling bearer SRB;
   a 2-step random access procedure in which the first message is used for sending uplink data through a data bearer DRB; and
   a 2-step random access procedure in which the first message is used for sending uplink data through a signaling bearer SRB.

4. The method for selecting a random access request resource according to claim 1, wherein the data size range of the uplink data is selected in one of the following manners:
   selecting at least one data size range capable of carrying the uplink data;
   selecting, from at least one data size range capable of carrying the uplink data, a data size range to which a size of the uplink data belongs;
   selecting, from at least one data size range capable of carrying the uplink data, a data size range based on a signal strength; and
   selecting, from at least one data size range capable of carrying the uplink data, a data size range based on a random number.

5. The method for selecting a random access request resource according to claim 2, wherein in a case that a plurality of uplink carriers configured for the random access request resource conflict with an uplink carrier corresponding to the data size range, the selecting the random access request resource corresponding to the data size range of the uplink data further comprises any one of the following:
   reselecting an uplink carrier;
   reselecting a data size range;
   selecting one uplink carrier out of selected uplink carriers; and
   selecting one data size range out of selected data size ranges.

6. The method for selecting a random access request resource according to claim 2, wherein in a case that a plurality of downlink signals configured for the random access request resource conflict with a downlink signal corresponding to the data size range, the selecting the random access request resource corresponding to the data size range of the uplink data further comprises any one of the following:
   reselecting a downlink signal;
   reselecting a data size range;
   selecting one downlink signal out of selected downlink signals; and
   selecting one data size range out of selected data size ranges.

7. A method for selecting a random access request resource, applied to a network device and comprising:
   sending configuration information for a random access procedure used for transmitting uplink data, wherein the configuration information is used for configuring at least one data size range and a random access request resource corresponding to each data size range,
   wherein the configuration information is used to indicate the terminal to select a random access request resource corresponding to a data size range of uplink data;
   the selecting the random access request resource corresponding to the data size range of the uplink data comprises:
   first selecting an uplink carrier corresponding to the random access procedure, and then selecting a downlink signal, and then selecting the data size range corresponding to the random access procedure, and then selecting a numbering range of the random access preamble for PRACH corresponding to the data size range, and then selecting a target time-frequency resource;
   wherein the uplink carrier comprises at least one of supplementary uplink (SUL) carrier or normal uplink (NUL) carrier.

8. The method for selecting a random access request resource according to claim 7, wherein the random access request resource comprises at least one of the following:
   a time-frequency resource corresponding to a random access request;
   a downlink signal corresponding to the random access request;
   a cell corresponding to the random access request;
   an uplink carrier corresponding to the random access request; and
   a code resource corresponding to the random access request.

9. The method for selecting a random access request resource according to claim 7, wherein a type of the random access procedure used for transmitting uplink data comprises at least one of the following:
   a 4-step random access procedure in which the third message is used for sending uplink data through a data bearer DRB;
   a 4-step random access procedure in which the third message is used for sending uplink data through a signaling bearer SRB;
   a 2-step random access procedure in which the first message is used for sending uplink data through a data bearer DRB; and
   a 2-step random access procedure in which the first message is used for sending uplink data through a signaling bearer SRB.

10. A terminal, comprising a memory, a processor, and a computer program stored in the memory and capable of running on the processor, wherein when the computer program is executed by the processor, the following steps are implemented:
   obtaining configuration information for a random access procedure used for transmitting uplink data, wherein the configuration information is used for configuring at least one data size range and a random access request resource corresponding to each data size range; and
   selecting, according to the configuration information, a random access request resource corresponding to a data size range of uplink data;
   wherein the selecting the random access request resource corresponding to the data size range of the uplink data comprises:
   first selecting an uplink carrier corresponding to the random access procedure, and then selecting a downlink signal, and then selecting the data size range corresponding to the random access procedure, and then selecting a numbering range of the random access preamble for PRACH corresponding to the data size range, and then selecting a target time-frequency resource;
   wherein the uplink carrier comprises at least one of supplementary uplink (SUL) carrier or normal uplink (NUL) carrier.

11. The terminal according to claim 10, wherein the random access request resource comprises at least one of the following:
   a time-frequency resource corresponding to a random access request;
   a downlink signal corresponding to the random access request;
   a cell corresponding to the random access request;
   an uplink carrier corresponding to the random access request; and
   a code resource corresponding to the random access request.

12. The terminal according to claim 10, wherein a type of the random access procedure used for transmitting uplink data comprises at least one of the following:
   a 4-step random access procedure in which the third message is used for sending uplink data through a data bearer DRB;
   a 4-step random access procedure in which the third message is used for sending uplink data through a signaling bearer SRB;
   a 2-step random access procedure in which the first message is used for sending uplink data through a data bearer DRB; and
   a 2-step random access procedure in which the first message is used for sending uplink data through a signaling bearer SRB.

* * * * *